(12) United States Patent
Feijen et al.

(10) Patent No.: US 8,492,505 B2
(45) Date of Patent: Jul. 23, 2013

(54) BRANCHED BIODEGRADABLE POLYMERS, A MACROMONOMER, PROCESSES FOR THE PREPARATION OF SAME, AND THEIR USE

(75) Inventors: Jan Feijen, Hengelo (NL); Zhiyuan Zhong, Hengelo (NL); Pieter Jelle Dijkstra, Borne (NL)

(73) Assignee: University of Twente, Enschede (NL)

( * ) Notice: Subject to any disclaimer, the term of this patent is extended or adjusted under 35 U.S.C. 154(b) by 215 days.

(21) Appl. No.: 11/916,261

(22) PCT Filed: May 31, 2006

(86) PCT No.: PCT/EP2006/005235
§ 371 (c)(1),
(2), (4) Date: Sep. 24, 2008

(87) PCT Pub. No.: WO2006/128704
PCT Pub. Date: Dec. 7, 2006

(65) Prior Publication Data
US 2009/0118459 A1     May 7, 2009

(30) Foreign Application Priority Data

Jun. 3, 2005 (EP) .................................... 05076302

(51) Int. Cl.
*C08G 63/85*     (2006.01)
(52) U.S. Cl.
USPC ........... 528/283; 514/178; 514/182; 528/398; 528/405
(58) Field of Classification Search
USPC .................. 528/357, 405, 283, 398; 514/178, 514/182
See application file for complete search history.

(56) References Cited

U.S. PATENT DOCUMENTS

| | | | | |
|---|---|---|---|---|
| 5,981,769 A * | 11/1999 | Baur et al. | .................... | 549/266 |
| 6,255,445 B1 * | 7/2001 | Dutton et al. | ................. | 528/354 |
| 2002/0183473 A1 * | 12/2002 | Matyjaszewski et al. | .... | 526/335 |
| 2003/0232968 A1 * | 12/2003 | Li et al. | .......................... | 530/350 |

OTHER PUBLICATIONS

Skaria, S. et al., "Enzyme catalyzed synthesis of hyperbranched aliphatic polyesters"; Macromolecular Rapid Communications (2002), 23(4): 292-296; XP002344954.
Trollsaas, M. et al., "Hyperbranched Poly (e-caprolactone)s"; Macromolecules (1998); 31: 3439-3445; XP002344955.
Trollsaas, M. et al., "Highly branched black copolymers: design, synthesis and morphology"; Macromolecules (1999), 32(15): 4917-4924; XP002344953.

* cited by examiner

*Primary Examiner* — Gregory Listvoyb
(74) *Attorney, Agent, or Firm* — Bozicevic, Field & Francis LLP; Bret E. Field; Louis-Vu T. Nguyen

(57) ABSTRACT

The present invention relates to a process for the preparation of branched biodegradable polymers comprising of the steps of: (a) preparing a macromonomer by ring-opening polymerization of at least one cyclic ester, cyclic carbonate, and/or cyclic carboxyanhydride in the presence of a branching agent and optionally a catalyst; and (b) subsequent polycondensation of the macromonomer, to a process for the preparation of a macromonomer by ring-opening polymerization of at least one cyclic ester, carbonate and/or N-carboxyanhydride in the presence of a defined branching agent and optionally a catalyst, according to step (a), and to the prepared macromonomer and branched biodegradable polymer and their uses.

27 Claims, No Drawings

BRANCHED BIODEGRADABLE POLYMERS, A MACROMONOMER, PROCESSES FOR THE PREPARATION OF SAME, AND THEIR USE

The present invention relates to branched biodegradable polymers, to a process for the preparation of branched biodegradable polymers, to their use for medical and non-medical applications, to a process for the preparation of a macromonomer, and to the use of the macromonomer in the preparation of the branched biodegradable polymers.

S. Skaria et al (Macromol. Rapid Commun. 2002, 23, 292-296) discloses an enzyme-catalyzed synthesis of hyperbranched aliphatic polyesters. These copolyesters are prepared by copolymerization of ε-caprolactone with 2,2-bis (hydroxymethyl)butyric acid. This copolymerization is catalyzed by immobilized lipase B from *Candida antarctica* under mild conditions.

Trollsås et al (Macromolecules 1998, 31, 3439-3445; 1998, 31, 4390-4395; J. Am. Chem. Soc. 1998, 120, 4644-4651, J. Polym. Sci.: Part A: Polym. Chem., 1998, 36, 3187-3192) discloses several different processes for the preparation of hyperbranched poly(ε-caprolactone)s. In all cases, firstly protected 2,2-bis-(hydroxymethyl) propionic acid (bisMPA), 2,2-bis(phenyldioxymethyl)propionic acid or benzylidene-protected 2,2-bis-(hydroxymethyl) propionic acid, is synthesized and used to prepare a protected $AB_2$-type functional α-carboxylic-ω-dihydroxy poly(ε-caprolactone) macromonomer. The protected macromonomer is subsequently deprotected via hydrogenolysis to yield α-carboxylic-ω-dihydroxy poly(ε-caprolactone). This $AB_2$ macromonomer is then condensed into hyperbranched polymers via a room temperature esterification synthesis using 1,3-dicyclohexyl-carbodiimide (DCC) and 4-(dimethylamino)pyridinium 4-toluenesulfonate (DPTS). The polymerization is carried out in $CH_2Cl_2$ over a period of 48 hours.

Choi and Kwak (Macromolecules, 2003, 36, 8630-8637) disclose the preparation of hyperbranched poly(ε-caprolactone)s via a modified procedure of Trollsås et al. Similar to Trollsås et al, a $AB_2$-type functional α-carboxylic-ω-dihydroxy poly(ε-caprolactone) macromonomer is firstly synthesized through steps of protection of bis-MPA, ring-opening polymerization of ε-caprolactone, and deprotection. Hyperbranched poly(ε-caprolactone)s are made by polyesterification of $AB_2$ macromonomer using p-toluenesulfonic acid (TSA) as a catalyst at 110° C. with continuous water removal.

Liu et al (Macromolecules, 1999, 32, 6881-6884) and Trollsås et al (Macromolecules, 1999, 32, 9062-9066) separately report the synthesis of hyperbranched poly(ε-caprolactone)s by so-called "self-condensing ring-opening polymerization" of 4-(2-hydroxyethyl)-ε-caprolactone and bis (hydroxymethyl)-substituted ε-caprolactone, respectively. The self-condensing polymerization is performed in bulk at 110° C. in the presence of a catalytic amount of stannous octoate.

Fumitaka et al (Macromol. Rapid Commun. 2001, 22, 820-824) reports the synthesis of branched polylactide by bulk copolymerization of lactide with mevalonolactone using stannous octoate or distannoxane as a catalyst.

The present invention has for its object to provide various types of branched biodegradable polymers via a novel process for their preparation. This process comprises a first step of ring-opening polymerization in the presence of a branching agent and a catalyst thereby forming a macromonomer, and a second step comprising a polycondensation of the macromonomer. This macromonomer is such that it is directly (without an intermediate deprotection step) used in the subsequent polycondensation step. This process is simple and can readily be scaled up. This two step process may be carried out in two pots but a one pot process is preferred. Furthermore, the process may be carried out in bulk or in solution. These branched polymers have relatively low viscosity, good solubility, and abundant reactive groups at the periphery. By varying monomers, branching agents, and monomer-to-branching agent ratios, branched biodegradable polymers with vastly different properties including hydrophilicity, thermal and mechanical properties, and degradation profiles can be obtained.

The cyclic esters and cyclic carbonates used in the first step of the process of the present invention preferably have the following general structure

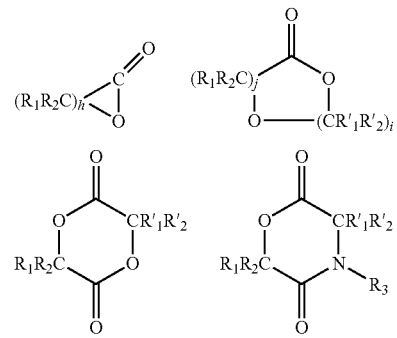

in which h is from 2 to 16, i is from 1 to 4, j is from 0 to 4, and $R_1$, $R_2$, $R_3$, $R'_1$ and $R'_2$ are the same or different and represent a hydrogen, or hydrocarbyl or substituted hydrocarbyl with protected O, N, and/or S functionality with a maximum of 30 carbon atoms.

$R_1$, $R_2$, $R_3$, $R'_1$ and $R'_2$ may have the same or different meaning. Each may represent hydrogen, or hydrocarbyl, such as methyl, ethyl, and propyl. Hydrogen and methyl are preferred. The substituted hydrocarbyl with protected O, N, and/or S functionality, is preferably $CH_2O$-Bz, $(CH_2)_4$—NH—$Z^1$, and $CH_2$—S-MBz wherein Bz is benzyl, $Z^1$ is benzyloxycarbonyl, and MBz is p-methoxybenzyl. The total number of carbon atoms is at maximum 30 because larger monomers are difficult to polymerize. Preferably, the number of carbon atoms is less than 20, such as less than 15.

Examples of suitable cyclic esters are

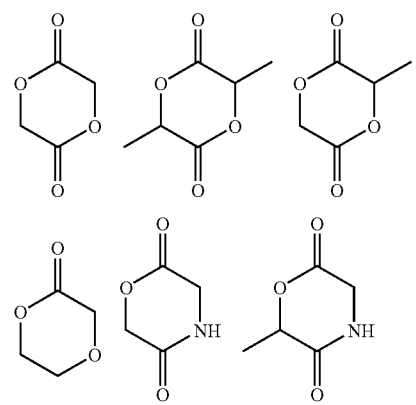

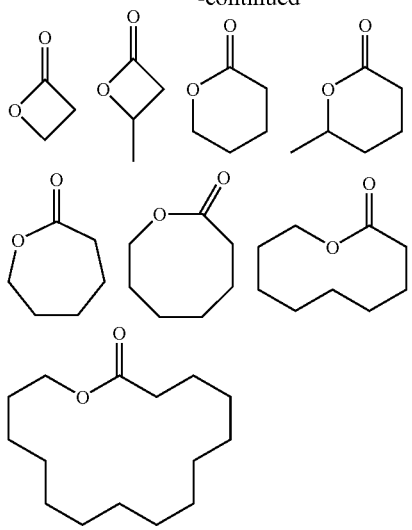

Examples of suitable cyclic carbonates are

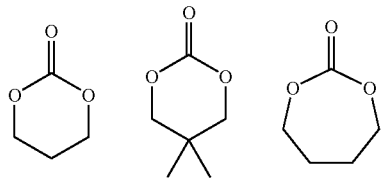

Preferred cyclic esters are β-propiolactone, β-butyrolactone, δ-valerolactone, alkyl-δ-valerolactone, ε-caprolactone, alkyl-ε-caprolactone, ω-pentadecalactone, dioxanone, lactide and glycolide. Preferred cyclic carbonates are trimethylene carbonate or 2,2-dimethyl trimethylene carbonate, and mixtures thereof. It is considered within the scope of protection of the present invention that mixtures of different cyclic esters and/or cyclic carbonates are used dependent on the desired properties of the branched biodegradable polymers according to the present invention.

The branching agent has the following formula

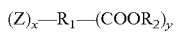

wherein Z is a hydroxyl, thiol, primary or secondary amine group, (x+y)≧3, $R_1$ is an aliphatic or aromatic moiety with or without ester, ether, amide, and/or ketone functionality, $R_2$ is a hydrogen, ($C_1$-$C_6$)-alkyl optionally substituted with halogen, or aryl such as phenyl optionally substituted with halogen or ($C_1$-$C_6$)-alkyl.

Preferably, Z is hydroxyl, (x+y) is 3 or 4 and x or y is 1, $R_2$ is a hydrogen, methyl or ethyl optionally substituted with halogen, or phenyl optionally substituted with methyl or halogen.

When the ring-opening polymerization comprises the ring-opening of the cyclic N-carboxyanhydride then it is preferred that the cyclic N-carboxyanhydride (NCA) has the following general structure

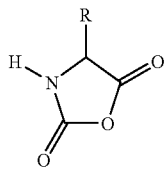

in which R represents a hydrogen, or hydrocarbyl, or hydrocarbyl with (protected) O, N, and/or S functionality, or hydrocarbyl with protected carboxylic acid, or aromatic group such as —$CH_2$Ph, and the branching agent has the following formula:

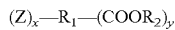

wherein Z is a primary amine group, (x+y)≧3, $R_1$ is an aliphatic or aromatic moiety with or without ester, ether, amide, and/or ketone functionality, $R_2$ is ($C_1$-$C_6$)-alkyl optionally substituted with halogen, or aryl, such as phenyl, optionally substituted with halogen or ($C_1$-$C_6$)-alkyl. The NCA is preferably an alpha-amino acid N-carboxyanhydride.

Preferably for the N-carboxyanhydride R represents methyl, isopropyl, isobutyl, —$CH_2CH_2SCH_3$, —$(CH_2)_4$NHCO$_2$C(CH$_3$)$_3$, —$CH_2OCH_2$Ph, —$CH_2COOCH_2$Ph, —$CH_2CH_2COOCH_2$Ph, or —$CH_2$Ph, wherein Ph means phenyl.

Examples of branching agents are

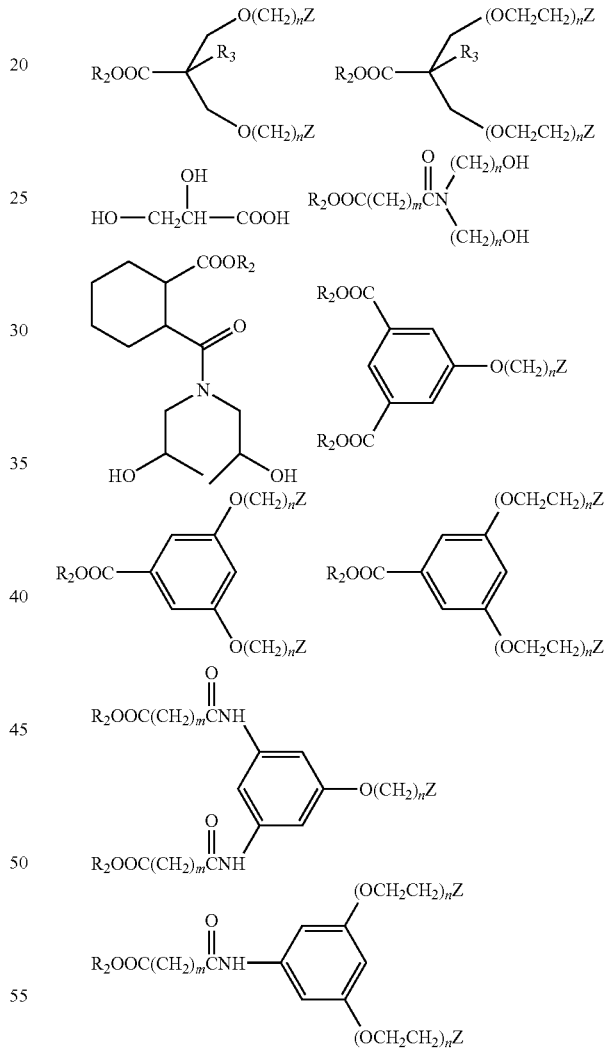

wherein  m = 2, 3, 4
n = 1, 2, 3, 4, 5, 6, 7, 8
$R_2$ = H, CH$_3$, CH$_2$CH$_3$, CH$_2$CF$_3$, Ph
$R_3$ = CH$_3$, CH$_2$CH$_3$,
Z = OH, SH, NHR', or NH$_2$ The ring-opening polymerization of the cyclic ester and/or cyclic carbonate is carried out in the presence of the branching agent and of a catalyst. The catalyst is a traditional catalyst for ring-opening polymerization and may be selected from alkyls, oxides, alkoxides, halides, and carboxylates of metals such as tin, titanium, aluminum, zirconium, antimony, yttrium, lanthanide, iron, manganese, calcium, magnesium, and zinc. When the cyclic NCA is used the reaction does not require the use of a catalyst.

In the polycondensation step b) a macromonomer or a mixture of macromonomers may be used. This mixture of macromonomers may be obtained in one step a) of ring-opening polymerization or by mixing macromonomers obtained in different ring-opening polymerizations.

The polycondensation may be carried out without or with a catalyst. If a catalyst is used a traditional catalyst for polycondensation may be used and may be selected from alkyls, oxides, alkoxides, halides, and carboxylates of metals such as tin, titanium, aluminum, zirconium, antimony, yttrium, lanthanide, iron, manganese, calcium, magnesium, and zinc. Other suitable catalysts are catalysts which are effective for esterification reactions like Lewis acids, protonic acids, or catalysts which include sulfuric acids, phosphoric acids, p-toluenesulfonic acid, and metal oxides, alkoxides, carbonates, halides and carboxylates wherein the metals are tin, titanium, aluminum, zirconium, antimony, yttrium, lanthanide, iron, manganese, calcium, magnesium, and zinc. The catalyst for the ring-opening polymerization and for the polycondensation may be the same. Preferably, the catalyst for the ring opening and/or for the poly condensation is selected from stannous octoate, dialkyltin oxide, stannous chloride, dialkyltin diacetate, zinc acetate, zinc lactate, and titanium alkoxides. It is noted that the polycondensation may be carried out under reduced pressure.

The ring-opening polymerization is generally performed in bulk at a temperature from 60 to 220° C. or in solution at a temperature from 10 to 200° C., over a period of a few minutes up to 72 hours. The molar ratio of cyclic monomer and branching agent ranges from 1:1 to 100:1. The polycondensation reaction may be performed in solution preferably at a temperature from 0 to 140° C., although more preferably carried out in the bulk under reduced pressure preferably at a temperature from 110 to 240° C. and over a period of time of 4 up to 72 hours.

The first step of the process of the invention for the preparation of branched biodegradable polymers results in the preparation of a macromonomer. This macromonomer as an intermediate compound is subsequently used in the second step of polycondensation.

At the beginning or during the polycondensation reaction may be present a bi- or more functional core molecule. This will further modify the structure and properties of the end product. Accordingly, it is preferred that polycondensation of the macromonomer in step b) is carried out in the presence of a core molecule selected from a polyol, polyamine, polycarboxylic acid and/or polycarboxylic ester. The core molecule may be a polyol such as glycerol, polyglycerol, tris(methylol) propane, di(trimethylolpropane), pentaerythritol, ethoxylated pentaerythritol, sorbitol, mannitol, sucrose, and star-shaped poly(ethylene glycol), a polyamine such as poly(L-lysine), spermidine and trimethylene tetramine, and a polycarboxylic acid or ester such as 1,2,3-butanetricarboxylic acid, trimesic acid, pyromellitic acid, and mellitic acid. Specific examples of the core molecule are

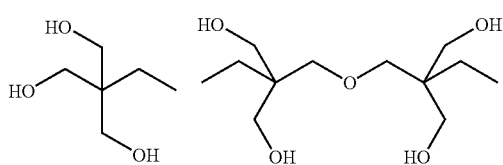

-continued

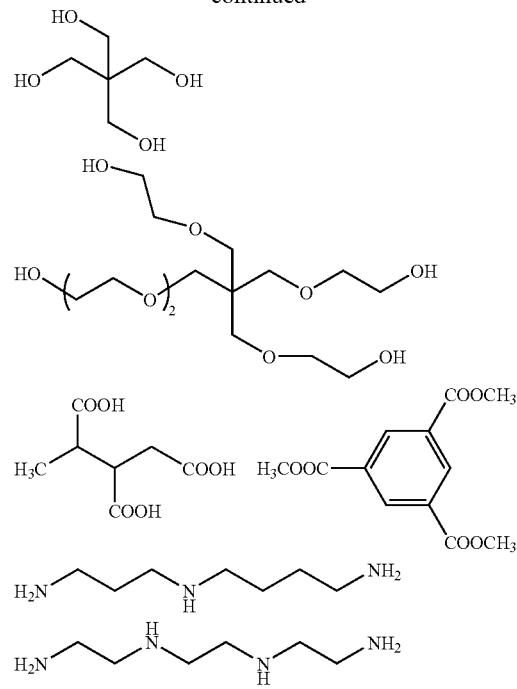

The branched biodegradable polymers according to the present invention have broad applications in biomedical and pharmaceutical areas. Particularly, the presence of many functional hydroxyl or carboxyl groups makes these polymers ideal for further modifications. For example, different biomolecules such as peptides and drugs can be covalently attached to these biodegradable polymers, to yield functional scaffolds for tissue engineering and controlled drug release systems. The attachment of hydrophilic polymers, such as polysaccharides and poly(ethylene glycol), will lead to a novel type of amphiphilic copolymers. The lower specific viscosity of branched polymers as compared to linear ones allows for easier melt fabrication of devices. Branched biodegradable polymers also have the advantage that the degradation and release kinetics can be adjusted without significantly changing the physical properties of the polymers relative to the corresponding linear polymers. Furthermore, these branched polymers are also useful as coatings for medical implants.

The branched polymers of this invention are also useful as processing aids for conventional biodegradable polymers, due to their low melt viscosity.

The process of the present invention will be further illustrated by way of an example which is used to illustrate the present invention and is to be considered not to limit the present invention in any respect.

EXAMPLE 1

Preparation of α-carboxylic-ω-dihydroxy poly(ε-caprolactone) macromonomer via ring-opening polymerization of ε-caprolactone in the presence of (2,2-bis-(hydroxymethyl) propionic acid (bis-MPA) and stannous octoate in bulk. ε-Caprolactone (15.0 g), bis-MPA (1.76 g), and stannous octoate (60 mg) were charged into a reactor. The ring-opening polymerization was carried out with mechanical stirring at 110° C. under argon atmosphere. After 6 hours, the polymerization was terminated by rapid cooling to room temperature. The $^1$H NMR (300 MHz, CDCl$_3$) of a crude reaction mixture showed a 100% monomer conversion. The reaction product was dissolved in CH$_2$Cl$_2$ and the macromonomer was precipitated from an excess of cold diethyl ether. Filtration followed by drying at 40° C. in vacuo yielded a white crystalline material. Yield: 15.1 g (90.1%). The $^1$H NMR of macromonomer confirmed that α-carboxylic-ω-dihydroxy poly(ε-caprolactone) with an Mn=1300 was synthesized.

EXAMPLE 2

Preparation of α-carboxylic-ω-dihydroxy poly(L-lactide) macromonomer via ring-opening polymerization of L-lactide in the presence of bis-MPA and stannous octoate in bulk. L-lactide (15.0 g), bis-MPA (0.349 g), and stannous octoate (60 mg) were charged into a reactor. The ring-opening polymerization was carried out with mechanical stirring at 130° C. under argon atmosphere. After 8 hours, the polymerization was terminated by rapid cooling to room temperature. The $^1$H NMR (300 MHz, CDCl$_3$) of a crude reaction mixture showed a 99% monomer conversion. The reaction mixture was dissolved in CH$_2$Cl$_2$ and the macromonomer was precipitated from an excess of cold diethyl ether. Filtration followed by drying at 40° C. in vacuo yielded a white crystalline material. Yield: 14.6 g (95.1%). The $^1$H NMR of macromonomer confirmed that α-carboxylic-ω-dihydroxy poly(L-lactide) with an Mn=6100 was synthesized.

EXAMPLE 3

Preparation of α-dicarboxylic-ω-hydroxy poly(DL-lactide) macromonomer via ring-opening polymerization of DL-lactide in the presence of malic acid and stannous octoate in bulk. DL-lactide (15.0 g), malic acid (0.465 g), and stannous octoate (60 mg) were charged into a reactor. The ring-opening polymerization was carried out with mechanical stirring at 130° C. under argon atmosphere. After 10 hours, the polymerization was terminated by rapid cooling to room temperature. The $^1$H NMR (300 MHz, CDCl$_3$) of a crude reaction mixture showed a 99% monomer conversion. The reaction mixture was dissolved in CH$_2$Cl$_2$ and the macromonomer was precipitated from an excess of cold diethyl ether. Filtration followed by drying at 40° C. in vacuo yielded an amorphous material. Yield: 14.1 g (91.2%). The $^1$H NMR of macromonomer confirmed that α-dicarboxylic-ω-hydroxy poly(DL-lactide) with an Mn=4400 was synthesized.

EXAMPLE 4

Preparation of α-carboxylic-ω-dihydroxy poly(trimethylene carbonate) macromonomer via ring-opening polymerization of trimethylene carbonate in the presence of (2,2-bis-(hydroxymethyl)butyric acid (bis-MBA) and stannous octoate in bulk. Trimethylene carbonate (15.0 g), bis-MBA (1.09 g), and stannous octoate (40 mg) were charged into a reactor. The ring-opening polymerization was carried out with mechanical stirring at 110° C. under argon atmosphere. After 6 hours, the polymerization was terminated by rapid cooling to room temperature. The $^1$H NMR (300 MHz, CDCl$_3$) of a crude reaction mixture showed a 98% monomer conversion. The reaction product was dissolved in CH$_2$Cl$_2$ and the macromonomer was precipitated from an excess of cold diethyl ether. Filtration followed by drying at 40° C. in vacuo yielded an amorphous material. Yield: 14.9 g (92.6%). The $^1$H NMR of macromonomer confirmed that α-carboxylic-ω-dihydroxy poly(trimethylene carbonate) with an Mn=2100 was synthesized.

EXAMPLE 5

Preparation of α-methyl ester-ω-dihydroxy poly(glycolide-co-L-lactide) macromonomer via ring-opening polymerization of glycolide and L-lactide in the presence of methyl 3,5-bis(tri(ethylene glycol))benzoate, and stannous octoate in bulk. Glycolide (5.25 g), L-lactide (9.75 g), methyl 3,5-bis(tri(ethylene glycol))benzoate (1.22 g), and stannous octoate (60 mg) were charged into a reactor. The ring-opening polymerization was carried out with mechanical stirring at 130° C. under argon atmosphere. After 8 hours, the polymerization was terminated by rapid cooling to room temperature. The $^1$H NMR (300 MHz, CDCl$_3$) of a crude reaction mixture showed a 98% monomer conversion. The reaction product was dissolved in CHCl$_3$ and the macromonomer was precipitated from an excess of cold diethyl ether. Filtration followed by drying at 40° C. in vacuo yielded an amorphous material. Yield: 15.3 g (94.3%). The $^1$H NMR of macromonomer confirmed that α-methyl ester-ω-dihydroxy poly(glycolide-co-L-lactide) with an Mn=5500 was synthesized.

EXAMPLE 6

Preparation of branched poly(ε-caprolactone) with bis-MPA as a branching agent via a one-pot two-step procedure. ε-Caprolactone (15.0 g), bis-MPA (1.76 g) and stannous octoate (60 mg) were charged into a reactor. The first step was ring-opening polymerization of ε-caprolactone. This step was carried out with mechanical stirring at 110° C. under argon atmosphere for 6 hours. As shown in example 1, this first step yielded an α-carboxylic-ω-dihydroxy poly(ε-caprolactone) macromonomer. The reactor was subsequently switched to vacuum and in the mean time the polymerization temperature was raised to 130° C. The second step, polycondensation of poly(ε-caprolactone) macromonomer, started. The polycondensation was allowed to proceed with mechanical stirring at 130° C. under reduced pressure. An increase in viscosity was observed during the process of polycondensation. After 16 hours polycondensation, the reaction was terminated by rapid cooling to room temperature. The $^1$H NMR (300 MHz, CDCl$_3$) of a crude reaction mixture showed a 100% monomer conversion. The reaction product was dissolved in CH$_2$Cl$_2$ and the branched poly(ε-caprolactone) was precipitated from an excess of cold diethyl ether. Filtration followed by drying at 40° C. in vacuo yielded a white crystalline material. Yield: 13.5 g (80.5%). Mn (GPC)=27900 g/mol.

EXAMPLE 7

Preparation of branched poly(trimethylene carbonate) by esterification of α-carboxylic-ω-dihydroxy poly(trimethylene carbonate) macromonomer in solution using 1,3-dicyclohexylcarbodiimide (DCC) and 4-(dimethylamino)pyridinium 4-toluenesulfonate (DPTS). Firstly, α-carboxylic-ω-dihydroxy poly(trimethylene carbonate) macromonomer (Mn=2100, 4.0 g, 1.9 mmol) was dissolved in 10 mL of CH$_2$Cl$_2$. Then, a THF solution of DPTS (0.090 g) and DCC (0.55 g), were introduced. The reaction was allowed to proceed for two days. Branched poly(trimethylene carbonate) was precipitated from an excess of methanol. Filtration followed by drying at 40° C. in vacuo yielded an amorphous material. Yield: 3.4 g (85%). Mn (GPC)=19500 g/mol.

EXAMPLE 8

Preparation of branched poly(ε-caprolactone) with bis-MPA as a branching agent and pentaerythritol as a core molecule. ε-Caprolactone (15.0 g), bis-MPA (1.76 g) and stannous octoate (60 mg) were charged into a reactor. The first step was ring-opening polymerization of ε-caprolactone. This step was carried out with mechanical stirring at 110° C. under argon atmosphere for 6 hours. As shown in example 1, this first step yielded an α-carboxylic-ω-dihydroxy poly(ε-caprolactone) macromonomer. Under an argon flow, pentaerythritol (90 mg) was added, the reactor was switched to vacuum and in the mean time the polymerization temperature was raised to 130° C. The second step, polycondensation of poly (ε-caprolactone) macromonomer in the presence of a core molecule, started. The polycondensation was allowed to proceed with mechanical stirring at 130° C. under reduced pressure. An increase in viscosity was observed during the process of polycondensation. After 16 hours polycondensation, the reaction was terminated by rapid cooling to room temperature. The $^1$H NMR (300 MHz, CDCl$_3$) of a crude reaction mixture showed a 100% monomer conversion. The reaction product was dissolved in CH$_2$Cl$_2$ and the branched poly(ε-caprolactone) was precipitated from an excess of cold diethyl ether. Filtration followed by drying at 40° C. in vacuo yielded a white crystalline material. Yield: 13.8 g (81.9%). Mn (GPC)=35600 g/mol.

EXAMPLE 9

Preparation of branched poly(L-alanine) using L-lysine methyl ester as a branching agent. Firstly, L-alanine-NCA (200 mmol) was dissolved in 200 mL of dichloromethane. Then a solution of L-lysine methyl ester (20 mmol) in dichloromethane was added via a syringe under an argon atmosphere. After 2 days, the polymer was precipitated from ethyl acetate. Filtration followed by drying at 40° C. in vacuo yielded α-methyl ester-ω-diamino poly(L-alanine) macromonomer. Yield: 13.4 g (77%). Mn (GPC)=900 g/mol.

The polycondensation of poly(L-alanine) macromonomer was carried out in methanol at 60° C. in the presence of a base catalyst triethylamine. Firstly, α-methyl ester-ω-diamino poly(L-alanine) macromonomer (5.0 g, 5.56 mmol) was dissolved in 30 mL methanol, then triethylamine (0.11 g) was added. Under stirring the reaction mixture was heated to 60° C. and the polycondensation reaction was allowed to proceed at 60° C. for 16 hours. Then, the polymerization mixture was cooled down, concentrated, and precipitated from ethyl acetate. Filtration followed by drying at 40° C. in vacuo yielded branched poly(L-alanine). Yield: 3.4 g (68%). Mn (GPC)=21400 g/mol.

The invention claimed is:
1. A process for the preparation of branched biodegradable polymers comprising of the steps of:
   (a) subjecting a first composition comprising at least one cyclic ester, cyclic carbonate and/or cyclic N-carboxyanhydride to ring opening polymerization conditions in the presence of a branching agent and optionally a catalyst to produce a second composition comprising a macromonomer, wherein the catalyst is an alkyl, an oxide, an alkoxide, a halide, or a carboxylate of a metal, wherein the branching agent has the following formula:

(Z)$_x$—R$_1$(COOR$_2$)$_y$ wherein Z is a hydroxyl, thiol, primary or secondary amine group; (x+y)≧3; R$_1$ is an aliphatic or aromatic moiety with or without ester, ether, amide, and/or ketone functionality; R$_2$ is a hydrogen, (C$_1$-C$_6$)-alkyl optionally substituted with halogen, or aryl, such as phenyl, optionally substituted with halogen or (C$_1$-C$_6$)-alkyl; and (b) subjecting the second composition comprising the macromonomer produced in step (a) to polycondensation without an intermediate deprotection step;
   wherein the polycondensation occurs under conditions different from the ring opening polymerization conditions,
   wherein the cyclic esters and carbonates have the following general structures:

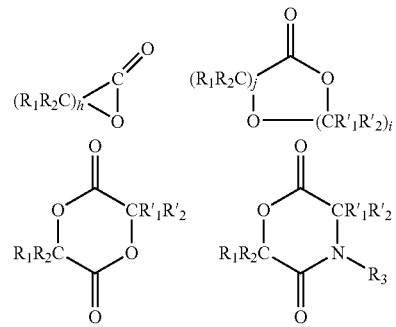

in which h is from 2 to 16, i is from 1 to 4, j is from 0 to 4, and R$_1$, R$_2$, R$_3$, R'$_1$ and R'$_2$ are the same or different and represent a hydrogen, or hydrocarbyl or substituted hydrocarbyl with protected O, N, and/or S functionality with a maximum of 30 carbon atoms;
   wherein the substituted hydrocarbyl with protected O, N and/or S functionality is CH$_2$O—Bz, (CH$_2$)$_4$—NH—Z$^1$, and CH$_2$—S-MBz wherein Bz is benzyl, Z$^1$ is benzyloxycarbonyl, and MBz is p-methoxybenzyl; and
   wherein the cyclic N-carboxyanhydride (NCA) has the following general structure

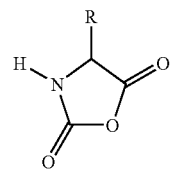

in which R represents a hydrogen, or hydrocarbyl, or hydrocarbyl with (protected) O, N, and/or S functionality, or hydrocarbyl with protected carboxylic acid, or aromatic group such as —CH$_2$Ph.

2. The process according to claim 1, wherein the cyclic ester and cyclic carbonate are those in which R$_1$, R$_2$, R$_3$, R'$_1$ and R'$_2$ are independently a hydrogen or methyl.

3. The process according to claim 2, wherein the cyclic ester is β-propiolactone, β-butyrolactone, δ-valerolactone, alkyl-δ-valerolactone, ε-caprolactone, alkyl-ε-caprolactone, ω-pentadecalactone, dioxanone, lactide and glycolide, and the cyclic carbonate is trimethylene carbonate and 2,2-dimethyl trimethylene carbonate, and mixtures thereof.

4. The process according to claim 1, wherein Z is hydroxyl, (x+y) is 3 or 4 and x or y is 1, R$_2$ is a hydrogen, methyl or ethyl optionally substituted with halogen, or phenyl optionally substituted with methyl or halogen.

5. The process according to claim 1, wherein the catalyst for the ring-opening polymerization is an alkyl, oxide, alkoxide, halide or carboxylate of a metal such as tin, titanium, aluminum, zirconium, antimony, yttrium, lanthanide, iron, manganese, calcium, magnesium, and zinc, and wherein polycondensation occurs in the presence of a polycondensation catalyst effective for an esterification reaction.

6. The process according to claim 1, wherein the catalyst for the ring opening and/or for the polycondensation is stannous octoate, dialkyltin oxide, stannous chloride, dialkyltin diacetate, zinc acetate, zinc lactate or titanium alkoxides.

7. The process according to claim 1 wherein R represents methyl, isopropyl, isobutyl, —$CH_2CH_2SCH_3$, —$(CH_2)_4$NHCO$_2$C(CH$_3$)$_3$, —$CH_2OCH_2Ph_2Ph$, —$CH_2OOOCH_2Ph$, —$CH_2CH_2COOCH_2Ph$, or —$CH_2Ph$, wherein Ph means phenyl.

8. The process according to claim 1 wherein the ring-opening polymerization is performed in bulk at a temperature from 60 to 220° C. or in solution at a temperature from 10 to 200° C., over a period of a few minutes up to 72 hours.

9. The process according to claim 1, wherein in step (b) the polycondensation is carried out on a first composition comprising a mixture of macromonomers.

10. The process according to claim 1, wherein the polycondensation reaction is carried out under a reduced pressure at a temperature from 110 to 240° C. and over a period of time of 4 up to 72 hours.

11. The process according to claim 1, wherein the step (b) is carried out in a solvent.

12. The process according to claim 1, wherein the polycondensation of the macromonomer in step (b) is carried out in the presence of a bi- or more functional core molecule selected from a polyol, polyamine, polycarboxylic acid, polycarboxylic ester, dextrin and/or dextran.

13. A process for the preparation of a composition comprising a macromonomer by ring-opening polymerization of at least one cyclic ester, cyclic carbonate, and/or cyclic, N-carboxyanhydride in the presence of the branching agent of claim 1, and optionally the catalyst of claim 1.

14. The macromonomer of step (a) of claim 1.

15. Use of the macromonomer of claim 14 in the preparation of the branched biodegradable polymers.

16. The branched biodegradable polymer of claim 1.

17. Use of branched biodegradable polymers according to claim 16, for medical and non-medical applications.

18. The branched biodegradable polymer of claim 16, wherein the polymer is covalently attached to a biomolecule.

19. The branched biodegradable polymer of claim 18, wherein the biomolecule is a peptide.

20. The branched biodegradable polymer of claim 18, wherein the biomolecule is a drug.

21. A medical implant comprising a coating, wherein the coating comprises the branched biodegradable polymer of claim 16.

22. The process of claim 1, wherein the catalyst is a non-enzymatic catalyst.

23. The process of claim 1, wherein the ring opening polymerization is done in the presence of the catalyst.

24. The process of claim 23, wherein the catalyst is stannous octoate.

25. The process of claim 5, wherein the catalyst for the ring-opening polymerization and the polycondensation catalyst are the same.

26. The process of claim 5, wherein the polycondensation catalyst is a Lewis acid, a protonic acid, or a basic catalyst, wherein the catalyst is a sulfonic acid, a phosphoric acid, a metal oxide, metal alkoxides, a metal carbonate, a metal halide or a metal carboxylate, and wherein the metal is tin, titanium, aluminum, zirconium, antimony, yttrium, lanthanide, iron, manganese, calcium, magnesium, or zinc.

27. The process according to claim 8, wherein the polyconderisation reaction is carried out under a reduced pressure at a temperature from 110 to 240° C. and over a period of time of 4 up to 72 hours.

* * * * *